Aug. 10, 1948.    J. BRISKIN ET AL    2,446,738
VIEW FINDER
Filed Oct. 6, 1945    2 Sheets-Sheet 1
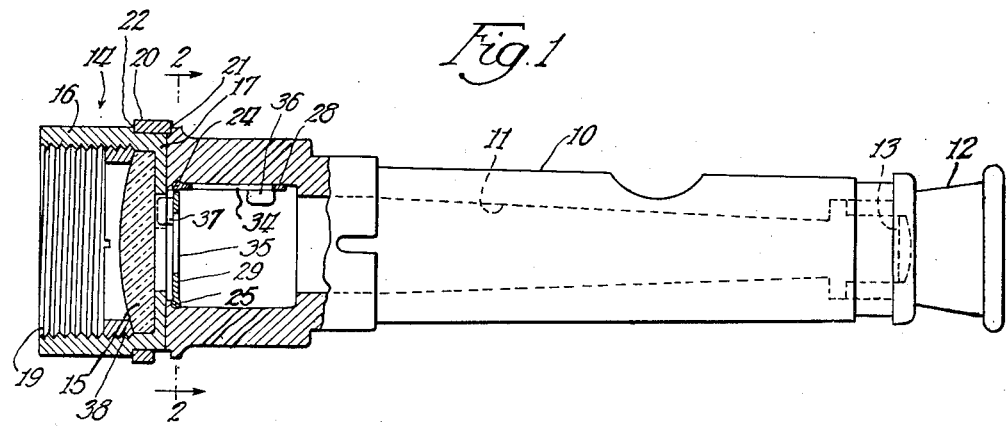
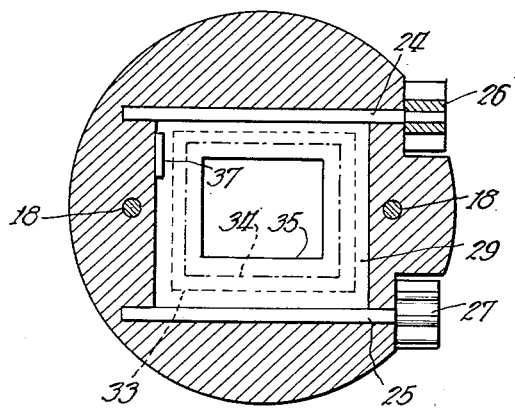
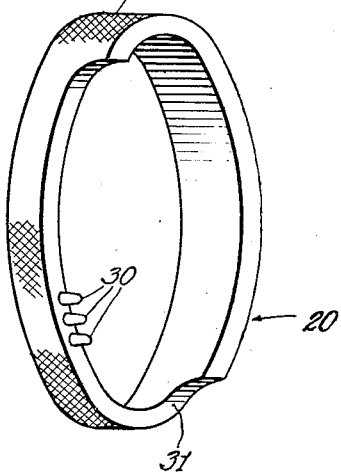
Inventors:
Jack Briskin and
Joseph Golick
By: Zabel and Gritzbaugh
Attys.

Aug. 10, 1948.   J. BRISKIN ET AL   2,446,738
VIEW FINDER
Filed Oct. 6, 1945   2 Sheets-Sheet 2
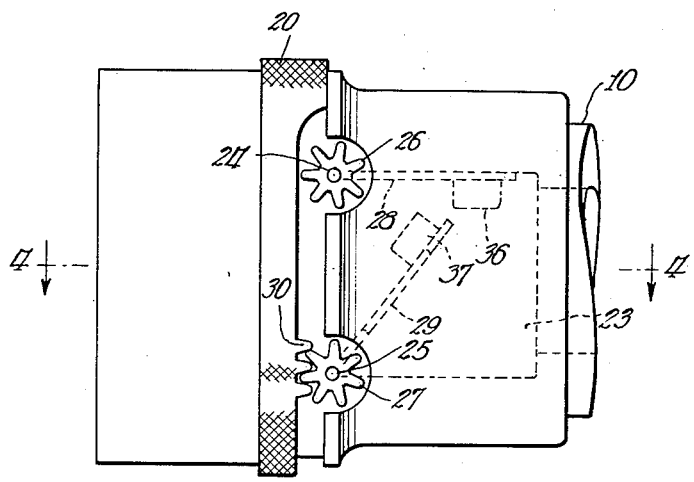
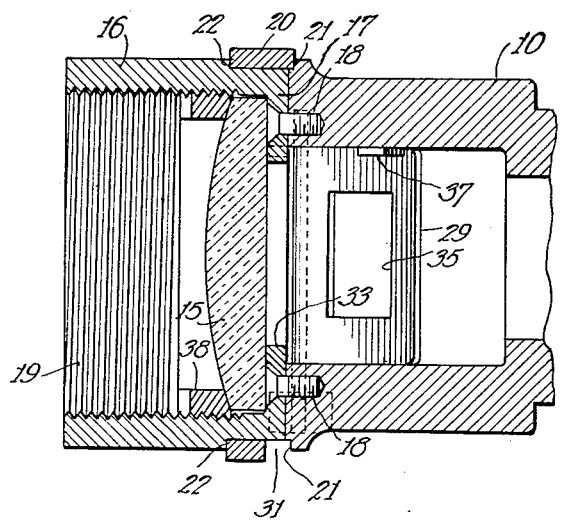
Inventors:
Jack Briskin and
Joseph Golick.
By: Zabel and Gritzbaugh
Attys.

Patented Aug. 10, 1948

2,446,738

UNITED STATES PATENT OFFICE 2,446,738

VIEW FINDER

Jack Briskin and Joseph Golick, Chicago, Ill., assignors to Revere Camera Company, Chicago, Ill., a corporation of Delaware Application October 6, 1945, Serial No. 620,692

4 Claims. (Cl. 33—64)

This invention relates to an improved view finder. A view finder is a device which is frequently used on cameras to assist the operator in determining the field of vision, that is, the matter which will be reproduced on the camera film.

It has been the practice in certain instances, to provide a camera having two or more sets of lenses for alternative use under various conditions. For instance, in addition to the regular lens a camera may be provided with one or more sets of telescopic lenses. The field of vision for the telescopic lenses is different than the field of vision for the regular lens. Hence, means should be provided on the view finder to indicate the proper field of vision. In the past, such means have sometimes comprised an etching on the lens of the view finder.

It is an object of this invention to provide a view finder which has one or more masks which may be brought into or out of operative position to indicate different fields of vision under different conditions.

It is a further object to provide a novel construction by means of which the mask may be mounted entirely within the confines of the view finder.

A still further object of this invention is to provide a novel construction whereby two masks of different sizes may be conveniently mounted within one view finder, and to provide a common control means for both masks.

Still another object is to provide a novel control means for a device of this type which does not project from the view finder to an objectionable extent.

Other objects, features and advantages will become apparent as the description proceeds.

With reference now to the drawings which illustrate a preferred embodiment of this invention, and in which like reference numerals designate like parts, Fig. 1 is an elevation of a view finder partly in section;

Fig. 2 is a vertical section taken along line 2—2 of Fig. 1;

Fig. 3 is an enlarged elevation of a portion of the view finder shown in Fig. 1, the parts being in a changed position;

Fig. 4 is a horizontal section taken along line 4—4 of Fig. 3; and

Fig. 5 is a detail view of the actuating ring.

The view finder comprises a tube 10 which is provided with a bore 11, through which one can look, in much the same manner as in a telescope. At one end of the tube is provided an eye piece 12 which includes a suitable lens 13.

At the opposite end of the tube is mounted an objective assembly 14 which includes an objective lens 15. The objective assembly includes a sleeve 16 which is provided with an inwardly directed flange 17, the sleeve being secured to the tube 10 by means of screws 18 which pass through the flange 17 and take into the tube. The sleeve 16 is internally threaded, as indicated by the reference numeral 19, and a lens holding ring 36 engages the threads 19 and serves to hold the lens 15 in proper position against the flange 17.

An actuating ring 20 is rotatably mounted on the sleeve 16 and the tube 10, at about the point where they abut each other. The actuating ring is confined to a given axial position by means of shoulders 21 and 22 on the tube 10 and sleeve 16, respectively.

The forward end of the bore 11 terminates in a chamber 23 which is preferably of rectangular shape. Transverse bores are provided in the tube 10 at the upper and lower forward corners of the chamber 23, and shafts 24 and 25 are disposed in said bores. One end of each of the shafts extends through the wall of the tube 10, and is provided with pinions 26 and 27, respectively. Masks 28 and 29 are mounted on the shafts 24 and 25. The outer dimensions of the masks are substantially the same as the cross section of the chamber 23 so that as one or the other of the pinions 26 and 27 are rotated, one or the other of the masks will be rotated from an inoperative position into an operative position in which the mask is disposed transversely to the axis of the view finder and serves to define the field of vision. The mask 28 is provided with an opening 34 which defines one field of vision, and the mask 29 is provided with a somewhat smaller opening 35 which defines a somewhat smaller field of vision.

A common actuating means is provided to cause rotation of the pinions 26 and 27. This actuating means comprises a series of teeth 30 which are disposed on the actuating ring 20, the arrangement being such that the teeth can engage either the pinion 26 or the pinion 27, to provide for alternative operation. It will be noted that the actuating ring 20 has a recessed portion 31 which permits it to clear the pinions 26 and 27. The ring may be provided with knurling 32.

The flange 17 is shaped so as to provide a rectangular opening 33, which serves to define still another field of vision. Fig. 2 shows in dotted lines the fields of vision defined by the flange opening 33, the opening 34 in the mask 28, and in solid lines the opening 35 in mask 29. Thus three different fields of vision may be defined, depending upon whether both of the masks are in inoperative position, or whether one or the other is in operative position.

In operation, one or the other of the above mentioned three positions of the parts is obtained, depending on whether the ring is disposed in an intermediate position in which the teeth 30 are between the two pinions, or whether it is urged to the limit of its rotation in the counterclockwise direction, or in the clockwise direction.

As shown in Fig. 5, the teeth 30 are rounded, or in the form of pins, to compensate for the fact that the travel of the teeth is not coplanar with the plane of rotation of the pinions. In other words, because the teeth are mounted on a ring, they cut across the plane of rotation diagonally. It will be understood, however, that a somewhat different form may be imparted to the teeth 30, and the pinions 26 and 27, to secure the same result.

In order to maintain the masks 28 and 29 in their various positions, springs 36 and 37 are formed along an edge of each mask, which springs are adapted to slide over the side walls of the chamber 23 and to introduce a friction. Of course, other means may be employed to maintain the parts in their proper position when the teeth 30 are not meshed with either of the pinions.

Although only a preferred embodiment of this invention has been shown and described herein, it will be understood that various modifications and changes may be made therein without departing from the spirit of the invention as defined in the appended claims.

We claim:

1. A view finder comprising a tubular member, a ring rotatably mounted on the exterior of said tubular member, a rack carried by said ring, two parallel shafts rotatably journaled in said tubular member, a mask secured to each shaft and disposed within said tubular member, and a pinion secured to each shaft in a position wherein one or the other of said pinions may be alternatively engaged by said rack upon rotation of said ring to cause said masks alternatively to be rotated into or out of operative positions wherein they are transverse to the axis of said tubular member.

2. In a view finder, a tubular member provided at its forward end with an inwardly directed flange which defines a rectangular field of vision, the forward end of said tubular member being provided with a chamber, a shaft journaled in said tubular member and extending into said chamber, a mask disposed in said chamber and secured to said shaft, a ring rotatably mounted on said tubular member, and a driving connection between said ring and said shaft to cause said mask to be rotated into and out of an operative position, wherein it is disposed against said flange to define a smaller field of vision than that defined by said flange.

3. In a view finder, a tubular member provided at its forward end with an inwardly directed flange which defines a rectangular field of vision, the forward end of said tubular member being provided with a chamber having oppositely disposed parallel walls, a shaft journaled in said tubular member and disposed along one of said walls, a mask secured to said shaft, a pinion secured to said shaft exteriorly of said tubular member, a ring rotatably mounted on said tubular member, means carried by said ring for meshing with said pinion to rotate the same from an inoperative position wherein said mask is disposed against said wall into an operative position wherein said mask is disposed against said flange to define a smaller field of vision, said mask having a rectangular opening therein.

4. A view finder comprising a tubular member having a chamber at its forward end, two parallel shafts rotatably mounted in said tubular member and extending into said chamber, a mask secured to each shaft and disposed within said chamber, the dimension of each mask in a direction perpendicular to said shaft being less than the distance between said shafts, so that one or the other of said masks may be rotated alternatively into a position substantially perpendicular to the longitudinal axis of said tubular member, whereby different fields of vision may be defined by said masks, and common means disposed on the exterior of said tubular member for causing rotation of one or the other of said shafts alternatively, said means being arranged so that only one of said shafts is rotated thereby at any one time.

JACK BRISKIN.
JOSEPH GOLICK.

REFERENCES CITED

The following references are of record in the file of this patent:

UNITED STATES PATENTS

| Number | Name | Date |
|---|---|---|
| 1,423,809 | Marks et al. | July 25, 1922 |
| 1,680,647 | Stark et al. | Aug. 14, 1928 |
| 1,795,490 | Howell | Mar. 10, 1931 |